United States Patent [19]

Barlow et al.

[11] 4,268,369

[45] May 19, 1981

[54] PROCESS OF MAKING SILICON DIOXIDE FILMS FOR USE AS WEAR RESISTANT COATINGS IN VIDEO AND DIGITAL MAGNETIC RECORDING

[75] Inventors: Malcolm Barlow, Sunnyvale; Jerry R. Lundquist, San Jose, both of Calif.

[73] Assignee: Ampex Corporation, Redwood City, Calif.

[21] Appl. No.: 71,269

[22] Filed: Aug. 30, 1979

Related U.S. Application Data

[62] Division of Ser. No. 817,004, Jul. 18, 1977.

[51] Int. Cl.³ .............................................. C23C 15/00
[52] U.S. Cl. ................................. 204/192 D; 427/130; 427/131; 427/132
[58] Field of Search ............................. 427/127–132, 427/48; 204/192 D

[56] References Cited

U.S. PATENT DOCUMENTS

| | | | |
|---|---|---|---|
| 3,164,493 | 1/1965 | Lindberg | 148/6.3 |
| 3,345,218 | 10/1967 | Brookover et al. | 148/6.3 |
| 3,767,369 | 10/1973 | Barlow | 427/131 |
| 4,154,875 | 5/1979 | Yanagisawa et al. | 427/130 |

OTHER PUBLICATIONS

IBM Tech. Dis. Bull., vol. 16, No. 12, 5–74 Heller, p. 3962.

*Primary Examiner*—Bernard D. Pianalto
*Attorney, Agent, or Firm*—Robert G. Clay; Robert G. Slick

[57] ABSTRACT

A magnetic recording medium of improved durability is obtained by depositing a coating of silicon dioxide over a magnetic metallic film.

1 Claim, No Drawings

PROCESS OF MAKING SILICON DIOXIDE FILMS FOR USE AS WEAR RESISTANT COATINGS IN VIDEO AND DIGITAL MAGNETIC RECORDING

This is a division of application Ser. No. 817,004, filed July 18, 1977.

SUMMARY OF THE INVENTION

Metal magnetic film of cobalt-nickel, cobalt and cobalt-nickel-phosphorus are used in high density magnetic recording media such as discs and drums. Such films can be deposited by electro or electroless plating or sputtering. A flying head is normally employed which flies with a clearance of about 100 microinches and makes contact with the medium only on start-up or stop. In more advanced systems, however, the head flies much closer (10-15 microinches) to the magnetic medium and may occasionally hit the disc during normal operation, as well as at start-up or stop.

In the past, many attempts have been made to provide protective coatings on such magnetic films. Some systems have employed a coating of a hard metal such as rhodium which is described by the present inventors in U.S. Pat. No. 3,767,369. In other systems, thermal oxide coatings of cobalt-nickel alloys (U.S. Ser. No. 659,528 filed Feb. 19, 1976, U.S. Pat. No. 4,029,541) and polymeric, organic films have been used over the magnetic surface.

In accordance with the present invention, we have found that the use of sputtered silicon dioxide over the recording surface is superior to any of the above coatings.

The adhesion of the silicon dioxide coating to the magnetic cobalt-nickel-phosphorus layer is of fundamental importance. The adhesion varies greatly and depends on the technique used to sputter the silicon dioxide. In general, if silicon dioxide is sputtered directly to the cobalt-nickel-phosphorus magnetic layers without a graded interface, poor to marginal adhesion may result although the magnetic medium may be satisfactory for some purposes. The relative adhesion is best indicated by vigorously rubbing a coated surface with a wiper soaked in methyl alcohol. If the silicon dioxide breaks up or flakes, better adhesion is needed. The preferred method to grade the interface from a metallic structure to an oxide structure is to bake the cobalt-nickel-phosphorus film in air at a low temperature of 100° C. to 200° C. Samples baked at 125° C. for three hours have exceptional adhesion as measured by the above test.

DESCRIPTION OF THE PREFERRED EMBODIMENTS

The following examples are intended to show the method of carrying out the invention and usefulness of silicon dioxide as a coating material.

Method of Preparation in General

An aluminum alloy (7075 or 5086) blank is machined to size and is then coated with 1 to 2 mils of electroless-nickel which is polished to the proper surface finish. A magnetic cobalt-nickel-phosphorus film is electrodeposited over the electroless-nickel and is sprayed with methyl alcohol and allowed to air dry at room temperature. The cobalt-nickel-phosphorus film is then baked for 2½ hours at a temperature of 125° C. to 140° C. in air to form a very thin oxide film.

This oxide film is preferred for good adhesion between the silicon dioxide and the magnetic layer but may be omitted if optimum protection is not required. Silicon dioxide sputtered directly onto metallic cobalt-nickel-phosphorus without the intermediate oxide film has relatively poor adhesion, and may be removed, for example, by vigorous rubbing with a paper towel saturated with methyl alcohol. The formation of this intermediate oxide film by baking in air is to be considered the preferred embodiment of this invention.

The disc is then sputtered with silicon dioxide using oxygen, argon or argon/oxygen plasmas. Typically, an oxygen plasma is obtained at a pressure of 80-90 millitorr using 300 watts of R.F. power on a 7.25" diameter disc. The disc is water cooled and an 8" diameter silicon dioxide target is used; the actual coating time is 20 minutes for a 4 microinch deposit. The disc temperature is not allowed to go over 125° C. during the sputtering operation so mechanical distortion is held to a minimum.

EXAMPLE 1

This series of examples demonstrate that a thin (1-20 microinches) coating of silicon dioxide has excellent wear characteristics when applied to discs possessing a wide range of surface finishes. Four discs with a smooth surface finish (0.4 microinches arithmetic average) were coated with silicon dioxide ranging in thickness from 4 microinches to 20 microinches, i.e. 1, 4, 12 and 20 microinches, using the method outlined above. These discs were then subjected to a life test using a head with a flying height of approximately 12 microinches, typical of video recording practice. After 100,000 start-stop cycles on a single track, no evidence of wear was visible on any disc. In two cases, an additional 100,000 start-stop cycles were conducted without failure on the same test track. Another test was conducted on discs that had a surface finish ranging from 1.0 to 1.5 microinches arithmetic average and coated as before. A typical digital head was used that flew at approximately 50 microinches. Even under these conditions, 100,000 start-stop cycles didn't produce any visible evidence of wear on a single track. These tests show that the silicon dioxide coating can be used in a wide variety of disc products. Since the silicon dioxide can be kept thin, the magnetic performance is good since spacing losses are kept to a minimum. In both of the above cases, there was no evidence of wear on the head.

EXAMPLE 2

The superior quality of $SiO_2$ sputtered films deposited in the above manner was again demonstrated in the following tests. A typical video disc was electroplated with a proper cobalt-nickel-phosphorus film as is set forth in U.S. Pat. No. 3,767,369 and then directly sputter-coated with approximately 10 microinches of silicon dioxide (i.e., the CoNiP interface was not oxidized in the preferred way). This disc was then placed on an Ampex HS100 video recording machine and tested for performance. The electrical performance was very good as no problems were noticed in reproducing a standard color bar pattern. This shows the spacing loss due to the coating is not appreciable. In this application, the head flew at approximately 10 microinches and was stepped continuously across the disc. Head disc performance was still good after 1600 hours of continuous use. No appreciable wear was noticed on the head, and no polymeric films (typical of rhodium plated discs) were generated during the course of the test. There was no degradation of electrical performance. In other words, even when the method of coating the disc was not optimized, good performance was achieved.

EXAMPLE 3

A digital type disc was plated with a cobalt-nickel-phosphorus film and, after initial oxidation, was sputter-coated with approximately 4 microinches of silicon dioxide set forth above. This disc passed all visual and electrical requirements for digital recording along with rigorous thermal cycling ($-55°$ C. to 65° C.). In addition, no problems were encountered in passing shock and vibration tests. The head flew very well on the disc and stiction (increased friction at start-up) was not a problem. Stiction is common to both thermally-produced oxide and rhodium coatings. Relative stiction measurements are made by noting the voltage required to start the disc with all the heads present. After several hundred start-stop cycles, the start-up voltage is measured again. Any increase in voltage is undesirable as this indicates the coating is wearing at an unacceptable rate or a polymeric film is building on the disc surface. The silicon dioxide surface provided an extremely clean interface between the head and disc components, and the problem of high frictional forces between the heads and disc at start-up were eliminated.

EXAMPLE 4

A disc was prepared as in Example 3 except that the magnetic coating was cobalt-phosphorus rather than cobalt-nickel-phosphorus. The disc was tested as before and satisfactory results obtained.

We claim:

1. The process of making a wear resistant magnetic recording medium comprising the following steps:
   a. providing a metallic, non-magnetic substrate,
   b. forming a metal magnetic film selected from cobalt-nickel, cobalt and cobalt-nickel-phosphorus over said substrate,
   c. oxidizing said magnetic film to provide a graded surface thereon by heating said metallic magnetic film in air at a temperature of from 100°–200° C. to form an oxidized interface layer over said metallic magnetic layer and,
   c. sputtering a film having a thickness of 1–20 microinches of silicon dioxide over the oxydized surface of said magnetic film.

* * * * *